United States Patent
Samsel

[11] 3,893,707
[45] July 8, 1975

[54] TOY VEHICLE
[75] Inventor: Frederick F. Samsel, Berwick, Pa.
[73] Assignee: The Raymond Lee Organization, Inc., New York, N.Y.; a part interest
[22] Filed: Feb. 19, 1974
[21] Appl. No.: 443,356

[52] U.S. Cl.............................. 280/208; 280/208
[51] Int. Cl............................................ B62k 9/11
[58] Field of Search............................ 280/208,206

[56] References Cited
UNITED STATES PATENTS
| | | | |
|---|---|---|---|
| 86,495 | 2/1869 | Beck | 280/208 |
| 319,682 | 6/1885 | Dickey | 280/208 |
| 356,028 | 1/1887 | Brown | 280/208 |

*Primary Examiner*—Leo Friaglia
*Attorney, Agent, or Firm*—Daniel Jay Tick

[57] ABSTRACT

A toy vehicle comprises a pair of wheels in spaced parallel relation. Each of the wheels has an internally toothed annular member on the surface thereof facing the other. An axle is rotatably mounted in the wheels at the centers thereof. A seat is rotatably supported on the axle and hangs below the axle. A pair of drive gears are provided. Each of the gears is drivably coupled to a corresponding one of the annular members. A hand crank is mounted on the seat and supports the drive gears for rotation with the hand crank for manually rotating the wheels.

1 Claim, 2 Drawing Figures

TOY VEHICLE

DESCRIPTION OF THE INVENTION

The present invention relates to a toy vehicle.

Objects of the invention are to provide a toy vehicle of simple structure, which is easy, convenient and simple to use and provides complete safety in use at the same time that it gives considerable delight, enjoyment, excitement and pleasure to a youngster using it.

Figure 1:
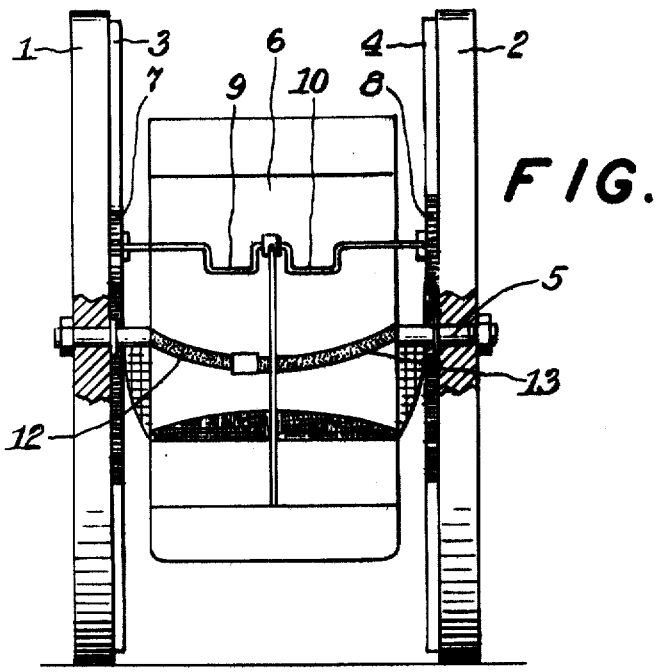
Figure 2:
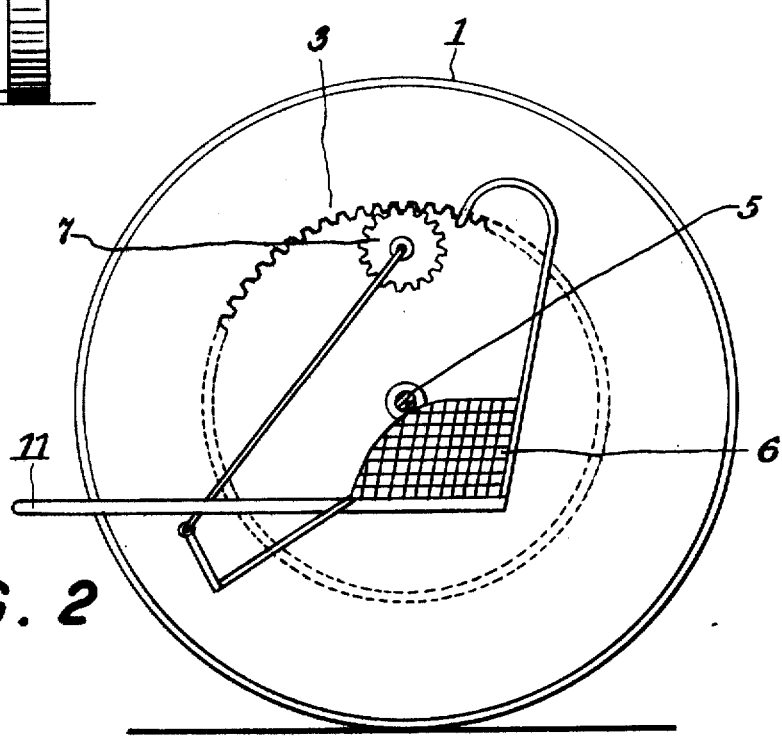

In order that the invention may be readily carried into effect, it will now be described with reference to the accompanying drawing, wherein:

FIG. 1 is a front view, partly cutaway and partly in section of an embodiment of the toy vehicle of the invention; and FIG. 2 is a side view of the embodiment of FIG. 1, with the wheel 2 removed.

In the FIGS., the same components are identified by the same reference numerals.

The toy vehicle of the invention comprises a pair of wheels 1 and 2 in spaced parallel relation. The wheel 1 has an internally toothed annular member 3 on the surface thereof facing the wheel 2. The wheel 2 has an internally toothed annular member 4 on the surface thereof facing the wheel 1.

An axle 5 is rotatably mounted in the wheels 1 and 2 at the centers thereof. A seat 6 is rotatably supported on the axle 5 and hangs below the axle so that it has a low center of gravity.

A pair of drive gears 7 and 8 are provided. The drive gear 7 is drivably coupled to the annular member 3. The drive gear 8 is drivably coupled to the annular member 4.

A pair of hand cranks 9 and 10 are mounted on the seat 6 and support the drive gears 7 and 8, respectively, for rotation with the hand cranks for manually rotating the wheels 1 and 2. Each of the hand cranks 9 and 10 is independently rotatably mounted. The hand crank 9 is affixed to the drive gear 7 and the hand crank 10 is affixed to the drive gear 8.

A rod 11, shown in FIG. 2, is removably affixed to the front of the seat 6 and extends beyond the rims of the wheels 1 and 2 for halting rotation of the seat with the wheels upon rotation of the wheels with the drive gears 7 and 8 fixed in position. That is, if the vehicle is rolling at a high speed, and the hand cranks 9 and 10 are held stationary, so that they are locked in position, the seat 6 will rotate with the wheels and the rider will move end over end with the seat. If the rod 11 or a pair of similar rods are affixed to the seat 6, the seat will not roll end over end. Seat belts 12 and 13 (FIG. 1) are provided.

While the invention has been described by means of a specific example and in a specific embodiment, I do not wish to be limited thereto, for obvious modifications will occur to those skilled in the art without departing from the spirit and scope of the invention.

I claim:

1. A toy vehicle, comprising a pair of wheels in spaced parallel relation each having an internally toothed annular member on the surface thereof facing the other;

an axle rotatably mounted in the wheels at the centers thereof;

a seat rotatably supported on the axle and hanging below the axle;

a pair of drive gears each drivably coupled to a corresponding one of the annular members;

hand crank means mounted on the seat and supporting the drive gears for rotation with the hand crank means for manually rotating the sheels, the hand crank means comprising a pair of hand cranks each independently rotatably mounted and each affixed to a corresponding one of the drive gears; and rod means removably affixed to the front of the seat and extending beyond the rims of the wheels for halting rotation of the seat with the wheels upon rotation of the wheels with the drive gears fixed in position.

* * * * *